No. 747,459. PATENTED DEC. 22, 1903.
C. MILLER.
NUT LOCK.
APPLICATION FILED MAY 16, 1903.
NO MODEL.

Witnesses
Otto E. Hoddick
Dena Nelson.

C. Miller.
Inventor
By
Attorney

THE NORRIS PETERS CO., PHOTO-LITHO., WASHINGTON, D. C.

No. 747,459. Patented December 22, 1903.

UNITED STATES PATENT OFFICE.

CONRAD MILLER, OF DENVER, COLORADO.

NUT-LOCK.

SPECIFICATION forming part of Letters Patent No. 747,459, dated December 22, 1903.

Application filed May 16, 1903. Serial No. 157,445. (No model.)

*To all whom it may concern:*

Be it known that I, CONRAD MILLER, a citizen of the United States of America, residing in the city and county of Denver and State of Colorado, have invented certain new and useful Improvements in Nut-Locks; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in nut-locks, my object being to provide a device of this class which not only effectually locks the nut in place against displacement incident to unscrewing when the locking device is in the locked position but which is of such character that by use of a wrench the locking device may be loosened by turning the nut slightly in the tightening direction.

The locking device consists of a ring or washer toothed on one side, the toothed part being raised above the plane of the body of the ring or above the plane of the inner face of the nut when screwed to position, whereby the nut is locked by a binding action between the nut and the locking-ring, the binding effect being produced by turning the ring to engagement with the nut and turning the nut slightly in the unscrewing direction. The locking-ring engages an eccentric collar or washer surrounding a bolt-hole in a plate through which the bolt passes. The locking-ring is adjustable to bring the raised toothed part at the farthest point from the center of the bolt or bolt-hole, so that the nut may be screwed down against the plate without interference from the locking-ring. After the nut is in position the locking-ring is turned to cause its toothed part to engage the nut. Then by turning the nut slightly in the direction to unscrew it the nut and ring are bound tightly together, whereby the nut can only be loosened by turning it slightly in the tightening direction.

Having briefly outlined my improved construction, the manner of its operation, and the objects to be accomplished thereby, I will proceed to describe the same in detail, reference being made to the accompanying drawings, in which is illustrated an embodiment thereof.

Figure 1:
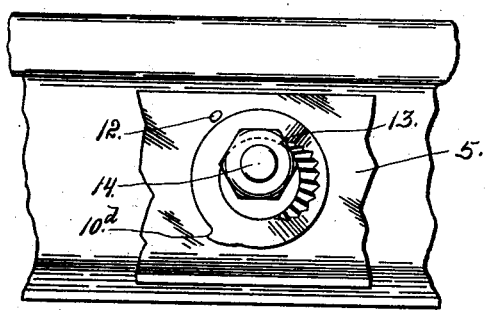
Figure 2:
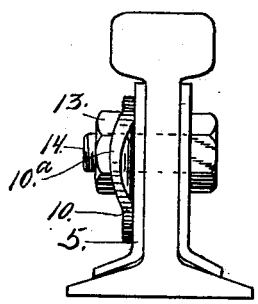
Figure 3:
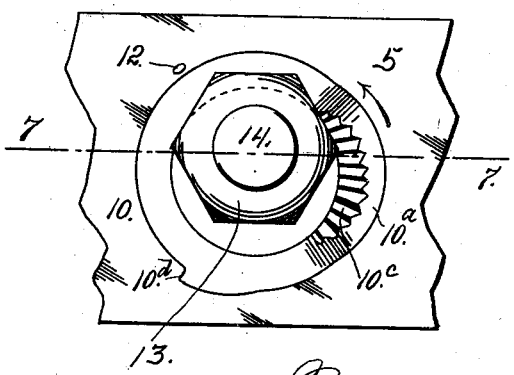
Figure 4:
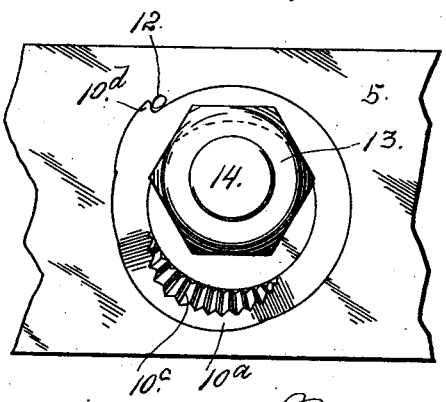
Figure 5:
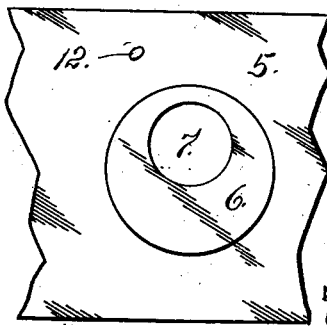
Figure 6:
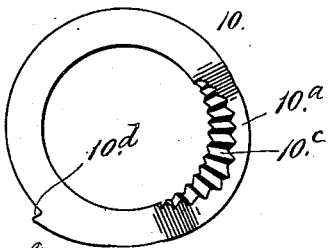
Figure 7:
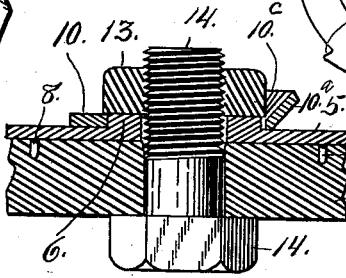

In the drawings, Figure 1 illustrates my improved device in use and in the locked position, the same being shown in connection with the angle-plate of a railroad-rail joint. Fig. 2 is a view taken at right angles to Fig. 1, the parts being shown in elevation. Fig. 3 shows the device, on a larger scale, in connection with the nut, bolt, and face-plate, the device being in the locked position. Fig. 4 is a similar view showing the device in the unlocked position. Fig. 5 illustrates the face-plate in detail. Fig. 6 shows the locking device in detail. Fig. 7 is a section taken on the line 7 7, Fig. 3, the bolt being shown in elevation.

The same reference characters indicate the same parts in all the views.

Let the numeral 5 designate a plate with which my improved locking device 10 is employed. This plate may be either the angle-plate of a rail-joint, as shown in Figs. 1 and 2, or a face-plate of any description, as shown in Figs. 3, 4, and 5. Upon this plate is formed a raised part 6, which may be termed a "collar" or "washer," surrounding a bolt-hole 7 in the plate and eccentric with the said bolt-hole. When this plate is used, as shown in Figs. 3, 4, and 7, studs or pins 8 are employed to enter the wood or other part 9 to prevent the face-plate from turning.

The locking device 10 consists of a ring whose interior periphery fits the outer periphery of the eccentric collar or washer 6, fast on the plate 5. A portion $10^a$ of the ring 10 is raised above the plane of the eccentric part 6, and this raised part is toothed adjacent the inner periphery of the device, as shown at $10^c$. The outer periphery of the device 10 is provided with an offset or tooth $10^d$, which engages a stop-pin 12, fast on the plate 5 when the locking-ring is in position, bringing its toothed or roughened part $10^c$ farthest from the center of the bolt-hole in the plate 5. (See Fig. 4.) When in this position, the nut 13 may be screwed down freely upon the bolt 14 to engagement with the part 6 and the body portion of the ring 10 on one side. The locking-ring may, if found necessary, be made slightly thinner than the part 6 to prevent any tendency to bind it against adjustment after the nut has been screwed down. The ring is then turned by the use of the finger until its toothed part engages the nut, after which the nut is turned slightly by the use of a wrench (not shown) in the direction to unscrew it. This act turns the ring in the same direction and causes the nut and ring to be bound tightly together, since the toothed part of the ring when turned in the direction indicated or in the direction of the arrow in Fig. 3 gradually approaches the center of the bolt-hole, and thus causes the binding together of the nut and locking device and positively locks the nut against unscrewing. When it is desired to remove the nut, the latter is turned slightly in the tightening direction by the use of a wrench. This act loosens the ring 10, which may then be turned to the position shown in Fig. 4, after which the nut may be freely unscrewed.

Having thus described my invention, what I claim is—

1. A nut-lock comprising a plate having a bolt-hole and a collar eccentric thereto, in combination with a locking-ring whose interior periphery fits the eccentric collar and is provided with a toothed or roughened part raised above the plane of the collar.

2. A nut-lock comprising a plate provided with a bolt-hole, a disk or collar fast thereon and eccentric with the hole, and a ring whose inner periphery fits the outer periphery of the collar, and is provided with a raised part adapted to engage the nut when the ring is properly adjusted.

3. In a nut-lock, the combination of a plate having a fast washer surrounding the bolt-hole in the plate and eccentric therewith, and a locking-ring engaging the said washer and adjustable thereon after the nut has been screwed to position on the bolt, the said ring having a part raised to engage the nut, when the locking-ring is properly adjusted.

4. The combination of a plate having a fast collar or washer whose outer periphery is eccentric with the bolt-hole formed in the plate, and a locking-ring fitting said collar and having a part projecting above the plane of the collar, the said ring being freely movable on the collar, whereby its raised part may be brought into locking engagement with the nut.

5. The combination with a bolt and nut, of a plate having a bolt-hole surrounded by an eccentric washer fast on or formed integral with the plate, and a locking-ring fitting the said washer and provided with a raised interiorly-toothed part, said ring being adjustable to bring the said toothed part into engagement with the nut when the latter is screwed to position.

6. The combination of a plate having a bolt-hole and an eccentric washer fast on the plate, the latter having a stop-pin adjacent the said washer, and a locking-ring engaging the eccentric washer and having an offset on its outer periphery to engage the stop-pin of the plate whereby the movement of the ring is limited in one direction.

7. A plate provided with a bolt-hole and a fast eccentric washer, in combination with a locking-ring fitting the said washer and adjustable thereon.

8. In a nut-lock, the combination of a plate having a bolt-hole and a fast washer eccentric with reference to the said hole, a locking-ring fitting the washer and movable thereon, and means for preventing the plate from turning on the part which it engages.

In testimony whereof I affix my signature in presence of two witnesses.

CONRAD MILLER.

Witnesses:
DENA NELSON,
A. J. O'BRIEN.